Figure 1:
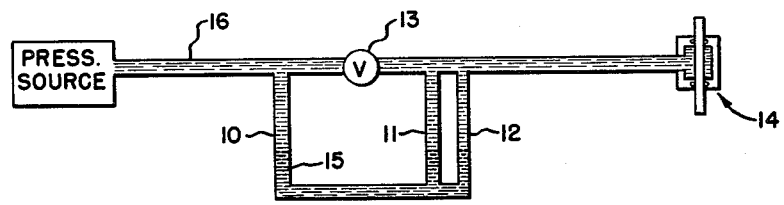

June 7, 1960  W. A. PRINCE  2,939,314
FLUID LEAKAGE METER
Filed Dec. 20, 1956

INVENTOR.
WILLIAM A. PRINCE
BY
*Walter J. Jason*
ATTORNEY

United States Patent Office 2,939,314
Patented June 7, 1960

2,939,314
FLUID LEAKAGE METER

William A. Prince, Escondido, Calif., assignor to General Dynamics Corporation, San Diego, Calif., a corporation of Delaware Filed Dec. 20, 1956, Ser. No. 629,585

8 Claims. (Cl. 73—40)

This invention relates to leakage meters and more particularly to meters for the measurement of volume of leakage under high pressure and high temperature extremes.

Heretofore leakage meters have been designed to measure rate of flow which, when timed, can be converted into quantity of leakage. In one such device a restriction is placed in the path and the fluid movement pushes this partial restriction up a scale which can be read through a glass window. Another measuring device places a restriction within the path so that the fluid flow must pass through a very small opening. A differential pressure gauge measures the pressure on both sides of the opening to thereby obtain the rate of leakage. Still another device completely restricts the fluid path and has a bypass fluid path around the restriction. When the bypass path is also restricted two pressure meters measure the pressure on both sides of the restriction in the main path. A differential reading indicates a leakage on one side or the other of the main restriction. However, these meters operate on a pressure measuring principle and require sufficient flow to suspend an indicator under flow pressure or sufficient flow to create differential pressure. This method is not satisfactory, for example, in measuring extremely small amounts of fluid at high pressure and temperature extremes as does the present meter.

The present invention comprises a leakage volume measuring meter which is capable of measuring extremely small amounts, a fraction of a drop, with a high degree of accuracy at pressures up to 10,000 pounds per square inch. Heretofore, the volume of fluid that leaks from a hydraulic system or component into atmosphere was measured in terms of drops per minute or per cycle of operation as the drops were caught in a beaker. However, the measure of such minute volumes under environmental conditions of pressure and temperature varies with geographical locations. With slow leakage under high temperature the drops vaporize before they can be measured. Counting the drops is not satisfactory either since a drop is not an exact measurement of volume. A drop of fluid will vary in size according to the object from which it falls. For example, a drop formed on the end of a needle is a great deal smaller than a drop which forms on the bottom of a bowling ball. For this reason, instead of externally measuring the volume of fluid that leaks from a component to atmosphere it is better to measure internally the volume that is removed from the system under given conditions of pressure and temperature. This has an additional advantage in that the leakage of a test component may be made at a place remote to the location of the test component. This is especially desirable if the component under extreme environmental conditions is leaking a highly explosive or inflammable fluid such as liquid oxygen.

It is therefore an object of this invention to provide for a meter for measuring minute quantities of fluid leakage.

It is another object to provide for an internal measurement of fluid volume leakage under given conditions of pressure and temperature without the actual measurement of fluid leaking from the system into the atmosphere.

Another object is the provision of a fluid volume leakage meter wherein the compressibility of the fluid due to pressure, the expansion of the fluid due to temperature, and the elasticity of the system tubing will not introduce error in the measurement.

Another object is the provision of a fluid leakage measurement device of simple design yet which is highly accurate and dependable in performance.

Figure 2:
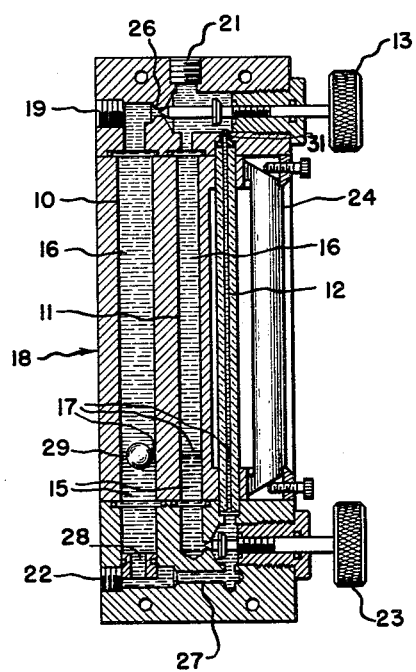
Figure 3:
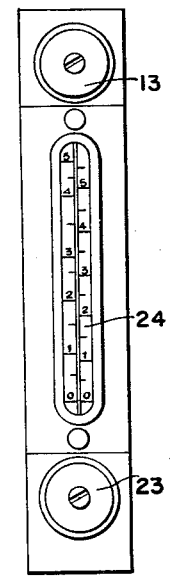

Other objects and features of the present invention will be readily apparent to those skilled in the art from the following specification and appended drawings wherein is illustrated a preferred form of the invention, and in which:

Figure 1 is a simplified schematic showing the principle behind, and operation of, the meter; and Figure 2 is a cross-sectional view of the preferred embodiment showing the addition of other valves and scales for measurement under pulsating pressures and to prevent the loss of instrument fluid; and Figure 3 is a front view showing the window section and two reading scales.

As shown in Figure 1 the meter is essentially a U-tube partly filled with a heavy fluid, such as mercury, to form an immiscible separation with the fluid in the pressure line to the component being tested. Leakage can be measured by the displacement of the separation fluid.

Columns 10 and 11 from the legs of the U-tube and column 12, which is a glass capillary tube capable of withstanding extremely high pressures, is used to observe and graduate the displacement. When the valve 13 is "open" pressure is applied to the test component 14 as well as to both legs 10 and 11 of the U-tube and the separation level remains stationary. When the valve 13 is closed pressure is directed to column 10 only and any leakage in the component 14 will effect a displacement of the separation level. Since the operation depends primarily on the differences in the specific gravities of the immiscible liquids, mercury is used for the instrument (lower) fluid 15, although other liquids are also suitable. To prevent any contamination of the fluid 16 with mercury a film 17 of liquid florochemical, such as liquid Teflon was put between the fluids. This liquid has a specific gravity between the values of these two fluids 15 and 16 and appears to be insoluble in either. It is to be noted that this interfacial separation could be accomplished by other methods.

The mechanical features of the device are quite simple and with the exception of a few innovations the design follows the schematic. As shown in Figure 2 the instrument is contained in a single housing 18 having a fluid inlet 19, a fluid outlet 21, a drain plug 22, an equalizing or regulating valve 13, a selector valve 23, and a window section 24, all externally visible. Inlet 19 is connected to column 10 at the top and drain plug 22 is connected to it at the bottom. Columns 10 and 11 are connected at the top by fluid path or passage 26 and at the bottom by fluid path or passage 27. Columns 10 and 11, together with passage 27, thus form a by-pass path around valve 13 in path 26. Equalizing valve 13 is operable to restrict fluid flow through passage 26 and selector valve 23 is operable to restrict fluid flow through passage 27. The instrument is zeroed by opening the equalizing valve 13. Valve 23 is also open. This compensates for compressibility of the fluid due to pressure, expansion of the fluid due to temperature, and errors that would be introduced due to the elasticity of the system tubing. When the valve 13 is closed any displacement of the separation film level would represent leakage. Since the area of column 11 and the bore of the capillary tube containing column 12 is predetermined the displaced volume of fluid due to leakage is known. To obtain the rate of leakage the displacement is timed. When the selector valve 23 is closed only the displacement of the small capillary tube is measured whereas when valve 23 is opened the simultaneous displacement of both columns 11 and 12 is measured. Window section 24 has two scales, shown in Figure 3, for obtaining a displacement reading in either situation. A ball check valve is incorporated in column 10 to prevent loss of the instrument fluid in the event of a rapid opening in the test component. This check valve comprises an opening 28 at the bottom of column 10 and a cooperating ball 29 which rides within column 10 on the surface of the lower, more dense liquid 15. This ball has a density intermediate the densities of the heavier liquid 15 and the lighter fluid 16 used in component 14 which is being tested for leakage. Should the seal in the component 14 suddenly fail causing excess leakage, the pressure of fluid 16 in column 10 would cause the height of fluid 15 in column 10 to rapidly decrease until the ball 29 seats over the smaller opening 28. To facilitate the separation of fluids and air in the capillary tube column 12 when the instrument is first filled a sharp edge nozzle 31 is provided at the top. Excess fluid 15 spilling over the top of column 12 then returns to the bottom of column 11. It is not necessary that the pressure on the fluid under test be constant. With a pulsating pressure the magnitude of fluctuations in the readout column will be a function of the diameter of column 11. Ordinarily, it is slight and if necessary compensated by reading the top of the oscillation at the initial and final readings. The accuracy of this instrument is very precise and is limited principally by the glass precision bore capillary tube 12 which is commercially available with bores as low as .0025 inch with a plus or minus tolerance of .00005 inch.

While this device was first used in hydraulic testing of leakage in pressure chambers and leakage between relatively movable components such as pistons, rotary shafts and other objects, it is a versatile and handy instrument having other applications. In addition to measuring the theoretical "ΔV" which appears in many hydraulic formulas, it also may be used to test the expansion of tubing or hose, and some of the characteristics of fluids, including such remote phenomena as viscosity. Because the testing may be done in a place remote from the location of the test component, its use is especially desirable in detecting and measuring leakage of components containing hazardous fluids.

The utility of this leakage measuring meter can be extended. When mercury is used, a plurality of electrical contacts or transducers can be incorporated in the second leg to produce an electrical signal proportional to fluid displacement (leakage). This permits the use of the meter for conditions limited by the glass capillary tube, or for the use with a timing device to give the "rate" of flow indication, or for the control of external forces, or for the measurement of hydraulic transient pressures. The meter may be further utilized by having a light beam projected across the separation level in the glass capillary tube on moving photographic paper. This would effect a non-electronic device for measuring and recording hydraulic transient pressures.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. Means for measuring fluid quantity leakage of fluid from a test component comprising a housing having a fluid inlet for connection to a fluid source and a fluid outlet for connection with a test component, a fluid path connecting said inlet to said outlet to permit fluid flow therebetween, valve means in said path selectively operable to prevent fluid flow therethrough, a bypass fluid path around said valve means and connected to said first named path on both sides thereof, said bypass path containing fluid movement indicating means, said bypass path comprising a downwardly extending leg having fluid connections to two upwardly extending legs of known inner cross-sectional areas, one of said upwardly extending legs including a high pressure resistant transparent wall for viewing fluid movement, a quantity of immiscible fluid of density greater than said test fluid in the bottom portions of said legs, and selector valve means between said downwardly extending leg and the other of said upwardly extending leg for selectively connecting and disconnecting said fluid connection therebetween.

2. Means for measuring fluid quantity leakage as in claim 1, said transparent wall having indicia means adjacent thereto for transposing fluid movement into fluid quantity, said indicia means including an indicating scale for use when said selector valve means is open and another indicating scale for use when said selector valve means is closed.

3. Means for measuring fluid quantity leakage as in claim 1, said leg having a transparent wall being of smaller cross-sectional area than said other upwardly extending leg, and hypodermic overflow means at the top of said leg of smaller area including a gravity return path connected to said other upwardly extending leg for return of said greater density fluid to the bottom thereof.

4. A fluid leakage meter for measuring minute leakage in components under high pressure and temperature comprising a housing having a fluid inlet for connection to a fluid source, a fluid outlet for connection with a test component, a first fluid path connecting said inlet to said outlet, said path having means for selectively restricting fluid flow therethrough, a second fluid path connecting said inlet to said outlet, said second path comprising a first column connected to said inlet, a second and third column connected to said outlet, all said columns being connected at one end thereof, means for selectively restricting fluid passage through said second column, said third column being of small uniform diameter in a transparent material and indicating means in said third column whereby fluid movement therein can be observed.

5. Means for measuring minute quantities of fluid leakage in a test component comprising a housing having an inlet and an outlet adapted for connection between a fluid source under predetermined pressure and said component, a first fluid path in said housing interconnecting said inlet and said outlet to permit fluid flow therebetween, regulating means in said first path for regulating said fluid flow, a second fluid path in said housing connected to said first fluid path on either side of said regulating means, said second fluid path comprising first and second interconnected columns, selector means for connecting and disconnecting said columns as desired, an upstanding high pressure resistant transparent tube of very small uniform inner bore communicating between said first column and said outlet, a quantity of immiscible liquid of greater density than said fluid in said columns and said tube and movable therewith during fluid movement, said transparent tube providing viewing means for watching movement of said liquid in said tube.

6. A fluid leakage meter comprising a housing having a fluid inlet for connection to a fluid source and a fluid outlet for connection with a test component, a first fluid path connecting said inlet to said outlet, said path having means for selectively restricting fluid flow therethrough, a second fluid path connecting said inlet to said outlet, said second path comprising a first column connected to said inlet, a second and third column connected to said outlet, said second and third columns being interconnected at both ends thereof and interconnected with said first column, said second column having means for selectively restricting fluid flow therethrough, a quantity of immiscible liquid in said columns of greater density than fluid being passed to said component, said third column being of small diameter and formed in high pressure resistant transparent material to permit viewing of fluid movement therein.

7. A fluid leakage meter as in claim 6, said second and third columns being substantially upright, said third column having an upper end sharp edge nozzle whereby said immiscible greater density liquid spilling over the top thereof will drain down into said second column.

8. Means for measuring minute leakage quantities of fluid from a test component comprising a housing having a fluid inlet for connection to a fluid source and a fluid outlet for connection with a test component, an opening to provide a fluid path in said housing connecting said inlet to said outlet to permit fluid flow therebetween, valve means in said path selectively operable to prevent fluid flow therethrough, and a bypass fluid path in said housing around said valve means and connected to said first named path on both sides thereof, said bypass path containing fluid movement indicating means.

References Cited in the file of this patent

UNITED STATES PATENTS

| | | |
|---|---|---|
| 283,490 | Hyatt | Aug. 21, 1883 |
| 1,393,942 | Chadwell | Oct. 18, 1921 |
| 1,720,934 | Toleik | July 16, 1929 |
| 1,858,399 | Jones | May 17, 1932 |
| 1,901,432 | Bradley | Mar. 14, 1933 |
| 2,853,874 | Mennesson | Sept. 30, 1958 |

FOREIGN PATENTS

| | | |
|---|---|---|
| 1,114,506 | France | Dec. 19, 1955 |